Patented May 24, 1927.

1,630,050

UNITED STATES PATENT OFFICE.

JOSEPH BRESLAUER AND CHARLES GOUDET, OF GENEVA, SWITZERLAND, ASSIGNORS TO SOCIÉTÉ D'ETUDES CHIMIQUES POUR L'INDUSTRIE, OF GENEVA, SWITZERLAND, A COMPANY OF SWITZERLAND.

PROCESS FOR THE MANUFACTURE OF UREA FROM CYANAMIDE.

No Drawing. Application filed January 27, 1923, Serial No. 615,375, and in Switzerland February 4, 1922.

There are many different methods of converting cyanamide into urea. For instance this substance is generally treated with acid catalyzers to facilitate the addition of a molecule of water. The treatment of the cyanamide with acids under pressure has also been already patented.

All hitherto known processes have certain drawbacks for instance the following ones:

1. When the cyanamide is treated with the acid catalyzers under ordinary pressure, it is necessary to employ a certain amount of acid, for instance sulphuric acid, to obtain a rapid conversion and to avoid the formation of polymerized products which always appear after a certain time.

According to the researches made, it is advisable to employ a quantity of acid corresponding to about 20 per cent of the quantity theoretically necessary for obtaining the complete conversion of the urea into sulphate of urea, or other salt of urea, depending upon the acid employed.

However it is impossible to employ less than 15 per cent of this quantity without prolonging in a dangerous manner the duration of the operation and without diminishing the output of urea, and increasing the amount of dicyandiamide and other polymerized products.

2. When the process is carried on under pressure (for instance according to the process of Immendorf & Kappen) at a temperature of 110° to 120° centigrade as it is described in the German Patents Nos. 257,642 and 257,643, about the same result is obtained. Even in employing greater quantities of acid Messrs. Immendorf & Kappen according to their patents, have not succeeded in converting more than 80 per cent of cyanamide into urea. But it ought to be pointed out that this quantity is determined in an indirect manner by diluting the sulphate of ammonium, and that quite arbitrarily it is assumed that the rest is urea.

The experiments made by applicants have shown that by proceeding according to the method of Immendorf & Kappen a yield is obtained which is much lower than that mentioned in their patent and that the final product not only consists of sulphate of ammonium and urea but contains polymers of cyanamide the amount of which varies according to the method employed.

Applicants have found that it is possible to obtain the desired result; that is, a nearly quantitative conversion of cyanamide into urea which is technically pure while diminishing the quantity of acids employed as catalyzers, when certain conditions of temperature and pressure are observed.

The present invention relates to a process for the manufacture of urea from cyanamide ($H_2CN_2$), which consists in treating at a temperature less than 75 degrees centigrade and at a pressure above the atmospheric pressure, a solution of cyanamide with an acid catalyzer in a quantity less than 10 per cent of the quantity of acid theoretically necessary for the fixation of the whole urea as a salt of urea.

The acid catalyzer may be an acid such for instance as sulphuric, phosphoric, nitric acid etc. or an acid salt such for instance as acid sulphate of sodium.

The quantity of acid serving as catalyzer for instance may be diminished until about 5 per cent of the theoretically necessary quantity, when one works at a pressure of about 5 to 7 atmospheres and at a temperature of about 70 degrees centigrade.

The best and the most rapid results have been obtained when about 7½ per cent acid has been employed at the temperature mentioned above.

Experiments which show it is possible to convert the whole quantity of the nitrogen of the cyanamide contained in the solution into urea, determined by the xanthydrol, have proven that for each concentration of cyanamide and a determined quantity of sulphuric acid, there exist conditions of temperature, and of duration of heating, which are to be found in each case by experiment.

Moreover it has been stated that from an economical point of view, it is advantageous to use solutions of cyanamide, which are as concentrated as possible.

Example: A solution of free cyanamide prepared by treating 1 kg. calcium cyanamide suspended in water with carbon dioxide, is added to 50 gr. concentrated sulphuric acid ($H_2SO_4$) or to a corresponding quantity of dilute sulphuric acid. The solution obtained is poured into an autoclave which is lined with lead and provided with a stirring device. In this autoclave a pressure of about 5 atmospheres is produced by means of an inert gas, for instance nitrogen. The autoclave is heated and maintained for about 6 hours at a temperature from 65 to 70 degrees centigrade during which time the contents is stirred. After this time the reaction is finished, the acid solution is neutralized by carbonate of lime and then filtered, whereafter the clear solution of urea is evaporated.

The output is quantitative with regard to the total nitrogen contained in the solution of cyanamide employed.

The described process offers, with regard to the hitherto known processes, the following advantages:

Owing to the simplicity of the operations and the small quantity of acid employed, it is possible to manufacture from calcium cyanamide, urea in a form which may be employed for agricultural purposes.

The small quantities of sulphuric acid which remain in the urea may either be converted into calcium sulphate by the carbonate of calcium and incorporated into the technical urea, or serve for the conversion of a small quantity of tricalcium phosphate into bi- or monocalcium phosphate by means of the processes belonging to us and described in other patent specifications.

In both the cases it is also possible to separate by filtration the insoluble sulphate or phosphate from the solution of urea and to employ separately the substances obtained thereby.

It is to be noted that the expense of acid may be considered as nil and that the process opens an unlimited field to the preparation of manures from calcium cyanamide.

We claim as our invention:

1. A process for the manufacture of urea from cyanamide consisting in treating a solution of cyanamide at a temperature of approximately 70° C. and at a pressure approximating 7 atmospheres by an acid catalyzer in a quantity less than 10% of the quantity of acid necessary for the fixation of the whole urea as a salt of urea.

2. A process for the manufacture of urea from cyanamide consisting in treating a concentrated solution of cyanamide at a temperature of approximately 70° C. and at a pressure approximating 7 atmospheres by an acid catalyzer less in quantity than 10% of the quantity of acid necessary for the fixation of the whole quantity of urea as a salt of urea.

3. A process for the manufacture of urea from cyanamide consisting in treating a solution of cyanamide at a temperature of approximately 70 degrees centigrade and under a pressure of approximately 7 atmospheres by an acid catalyzer in a quantity approximating 5 per cent of the quantity of acid necessary for the fixation of the whole quantity of urea as a salt of urea.

In testimony whereof we have affixed our signatures.

Dr. JOSEPH BRESLAUER.
Dr. CHARLES GOUDET.